(12) United States Patent
Savitzky et al.

(10) Patent No.: US 8,380,866 B2
(45) Date of Patent: Feb. 19, 2013

(54) TECHNIQUES FOR FACILITATING ANNOTATIONS

(75) Inventors: Stephen Savitzky, San Jose, CA (US);
Bradley Rhodes, Alameda, CA (US);
John Barrus, Menlo Park, CA (US);
Hidenobu Kishi, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 890 days.

(21) Appl. No.: 12/408,583

(22) Filed: Mar. 20, 2009

(65) Prior Publication Data

US 2010/0241691 A1    Sep. 23, 2010

(51) Int. Cl.
*G06F 15/16*   (2006.01)

(52) U.S. Cl. ........ 709/231; 709/204; 709/205; 715/730; 455/566

(58) Field of Classification Search .................... 709/231
See application file for complete search history.

(56) References Cited

U.S. PATENT DOCUMENTS

| | | |
|---|---|---|
| 4,578,718 A | 3/1986 | Parker et al. |
| 4,686,698 A | 8/1987 | Tompkins et al. |
| 4,787,063 A | 11/1988 | Muguet |
| 4,807,186 A | 2/1989 | Ohnishi et al. |
| 4,881,135 A | 11/1989 | Heilweil |
| 4,905,094 A | 2/1990 | Pocock et al. |
| 4,963,995 A | 10/1990 | Lang |
| 5,091,931 A | 2/1992 | Milewski |
| 5,164,839 A | 11/1992 | Lang |
| 5,206,929 A | 4/1993 | Langford et al. |
| 5,265,205 A | 11/1993 | Schroder |
| 5,321,396 A | 6/1994 | Lamming et al. |
| 5,363,425 A | 11/1994 | Mufti et al. |
| 5,436,792 A | 7/1995 | Leman et al. |
| 5,475,741 A | 12/1995 | Davis et al. |
| 5,485,611 A | 1/1996 | Astle |
| 5,491,511 A | 2/1996 | Odle |
| 5,502,774 A | 3/1996 | Bellegarda et al. |
| 5,526,037 A | 6/1996 | Cortjens et al. |
| 5,530,235 A | 6/1996 | Stefik et al. |

(Continued)

FOREIGN PATENT DOCUMENTS

| | | |
|---|---|---|
| JP | 403129990 A | 3/1991 |
| JP | 07-234694 A | 9/1995 |

(Continued)

OTHER PUBLICATIONS

Notice of Allowance for U.S. Appl. No. 09/728,453, mailed on Sep. 18, 2009, 16 pages.

(Continued)

*Primary Examiner* — Patrice Winder
*Assistant Examiner* — Neeraj Utreja
(74) *Attorney, Agent, or Firm* — Kilpatrick Townsend & Stockton LLP

(57) ABSTRACT

Techniques for facilitating annotation of information. Techniques are provided that enable one or more users to annotate video information being displayed by an output device. Different annotation modes may be provided. For example, in one mode, a device is provided that can capture a video frame from video information being output by an output device. One or more users may then annotate the captured video frame. The annotations may be communicated to the output device such that the output displays the captured video frame along with annotations made to the video frame. Other annotation modes are also provided.

24 Claims, 5 Drawing Sheets

U.S. PATENT DOCUMENTS

| | | |
|---|---|---|
| 5,535,063 A | 7/1996 | Lamming |
| 5,537,141 A | 7/1996 | Harper et al. |
| 5,539,665 A | 7/1996 | Lamming et al. |
| 5,568,406 A | 10/1996 | Gerber |
| 5,596,581 A | 1/1997 | Saeijs et al. |
| 5,610,841 A | 3/1997 | Tanaka et al. |
| 5,633,723 A | 5/1997 | Sugiyama et al. |
| 5,635,982 A | 6/1997 | Zhang et al. |
| 5,673,016 A | 9/1997 | Lutes |
| 5,686,957 A | 11/1997 | Baker |
| 5,706,290 A | 1/1998 | Shaw et al. |
| 5,717,869 A | 2/1998 | Moran et al. |
| 5,717,879 A | 2/1998 | Moran et al. |
| 5,721,878 A | 2/1998 | Ottesen et al. |
| 5,729,741 A | 3/1998 | Liaguno et al. |
| 5,729,931 A | 3/1998 | Wade |
| 5,734,719 A | 3/1998 | Tsevdos et al. |
| 5,751,281 A | 5/1998 | Hoddie et al. |
| 5,760,767 A | 6/1998 | Shore et al. |
| 5,764,789 A | 6/1998 | Pare, Jr. et al. |
| 5,767,897 A | 6/1998 | Howell |
| 5,793,365 A | 8/1998 | Tang et al. |
| 5,799,150 A | 8/1998 | Hamilton et al. |
| 5,802,294 A | 9/1998 | Ludwig et al. |
| 5,845,261 A | 12/1998 | McAlbian |
| 5,854,831 A | 12/1998 | Parsadayan et al. |
| 5,862,292 A | 1/1999 | Kubota et al. |
| 5,918,237 A | 6/1999 | Montalbano |
| 5,924,099 A | 7/1999 | Guzak et al. |
| 5,929,848 A | 7/1999 | Albukerk et al. |
| 5,946,654 A | 8/1999 | Newman et al. |
| 5,956,026 A | 9/1999 | Ratakonda |
| 5,978,477 A | 11/1999 | Hull et al. |
| 5,986,655 A | 11/1999 | Chiu et al. |
| 5,987,454 A | 11/1999 | Hobbs |
| 5,990,934 A | 11/1999 | Nalwa |
| 5,991,429 A | 11/1999 | Coffin et al. |
| 5,999,173 A | 12/1999 | Ubillos |
| 6,008,807 A | 12/1999 | Bretschneider et al. |
| 6,020,883 A | 2/2000 | Herz et al. |
| 6,041,360 A | 3/2000 | Himmel et al. |
| 6,055,566 A | 4/2000 | Kikinis |
| 6,084,582 A | 7/2000 | Qureshi et al. |
| 6,115,718 A | 9/2000 | Huberman et al. |
| 6,154,601 A | 11/2000 | Yaegashi et al. |
| 6,154,771 A | 11/2000 | Rangan et al. |
| 6,177,939 B1 | 1/2001 | Blish et al. |
| 6,189,783 B1 | 2/2001 | Motomiya et al. |
| 6,193,658 B1 | 2/2001 | Wendelken et al. |
| 6,209,000 B1 | 3/2001 | Klein et al. |
| 6,249,281 B1 | 6/2001 | Chen et al. |
| 6,332,147 B1 | 12/2001 | Moran et al. |
| 6,334,109 B1 | 12/2001 | Kanevsky et al. |
| 6,349,297 B1 | 2/2002 | Shaw et al. |
| 6,369,835 B1 | 4/2002 | Lin |
| 6,392,694 B1 | 5/2002 | Bianchi |
| 6,393,462 B1 | 5/2002 | Mullen-Schultz |
| 6,396,500 B1 | 5/2002 | Qureshi et al. |
| 6,405,203 B1 | 6/2002 | Collart |
| 6,418,421 B1 | 7/2002 | Hurtado et al. |
| 6,421,009 B2 | 7/2002 | Suprunov |
| 6,449,653 B2 | 9/2002 | Klemets et al. |
| 6,452,615 B1 | 9/2002 | Chiu et al. |
| 6,469,711 B2 | 10/2002 | Foreman et al. |
| 6,490,601 B1 | 12/2002 | Markus et al. |
| 6,510,553 B1 | 1/2003 | Hazra |
| 6,526,426 B1 | 2/2003 | Lakritz |
| 6,529,920 B1 | 3/2003 | Arons et al. |
| 6,535,639 B1 | 3/2003 | Uchihachi et al. |
| 6,571,295 B1 | 5/2003 | Sidana |
| 6,646,655 B1 | 11/2003 | Brandt et al. |
| 6,665,490 B2 | 12/2003 | Copperman et al. |
| 6,721,288 B1 | 4/2004 | King et al. |
| 6,721,488 B1 | 4/2004 | Dimitrova et al. |
| 6,728,753 B1 | 4/2004 | Parasnis et al. |
| 6,750,978 B1 | 6/2004 | Marggraff et al. |
| 6,766,363 B1 | 7/2004 | Rothschild |
| 6,779,024 B2 | 8/2004 | DeLaHuerga |
| 6,782,049 B1 | 8/2004 | Dufaux et al. |
| 6,789,228 B1 | 9/2004 | Merril et al. |
| 6,810,146 B2 | 10/2004 | Loui et al. |
| 6,816,858 B1 | 11/2004 | Coden et al. |
| 6,976,032 B1 | 12/2005 | Hull et al. |
| 7,020,721 B1 | 3/2006 | Levenberg |
| 7,039,198 B2 | 5/2006 | Birchfield et al. |
| 7,080,386 B2 | 7/2006 | Thrift et al. |
| 7,102,670 B2 | 9/2006 | Seaman et al. |
| 7,108,192 B2 | 9/2006 | Lapstun |
| 7,131,058 B1 | 10/2006 | Lapstun et al. |
| 7,167,191 B2 | 1/2007 | Hull et al. |
| 7,174,289 B2 | 2/2007 | Sukehiro |
| 7,184,100 B1 | 2/2007 | Wilf et al. |
| 7,215,436 B2 | 5/2007 | Hull et al. |
| 7,225,407 B2 | 5/2007 | Sommerer et al. |
| 7,236,596 B2 | 6/2007 | Prokoski |
| 7,260,257 B2 | 8/2007 | Zhang et al. |
| 7,299,405 B1 | 11/2007 | Lee et al. |
| 7,303,476 B2 | 12/2007 | Blanco et al. |
| 7,313,762 B2 | 12/2007 | Bozdagi et al. |
| 7,340,450 B2 | 3/2008 | Sugahara et al. |
| 7,343,617 B1 | 3/2008 | Katcher et al. |
| 7,349,008 B2 | 3/2008 | Rui et al. |
| 7,370,269 B1 | 5/2008 | Prabhu et al. |
| 7,382,974 B2 | 6/2008 | Kameyama et al. |
| 7,428,000 B2 | 9/2008 | Cutler et al. |
| 7,478,125 B2 | 1/2009 | Chang |
| 7,487,551 B2 | 2/2009 | Carpentier et al. |
| 7,508,419 B2 | 3/2009 | Toyama et al. |
| 7,512,883 B2 | 3/2009 | Wallick et al. |
| 7,554,576 B2 | 6/2009 | Erol et al. |
| 7,653,925 B2 | 1/2010 | Hull et al. |
| 7,669,127 B2 | 2/2010 | Hull et al. |
| 7,685,426 B2 | 3/2010 | Ramos et al. |
| 7,689,712 B2 | 3/2010 | Lee et al. |
| 2001/0037408 A1 | 11/2001 | Thrift et al. |
| 2001/0054019 A1 | 12/2001 | de Fabrega |
| 2002/0010641 A1 | 1/2002 | Stevens et al. |
| 2002/0048224 A1 | 4/2002 | Dygert et al. |
| 2002/0056082 A1 | 5/2002 | Hull et al. |
| 2002/0097885 A1 | 7/2002 | Birchfield et al. |
| 2002/0163548 A1 | 11/2002 | Chiu et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2003/0007776 A1 | 1/2003 | Kameyama et al. |
| 2003/0117652 A1 | 6/2003 | Lapstun |
| 2003/0220988 A1 | 11/2003 | Hymel |
| 2003/0231198 A1 | 12/2003 | Janevski |
| 2003/0234772 A1 | 12/2003 | Zhang et al. |
| 2004/0054964 A1 | 3/2004 | Bozdagi et al. |
| 2004/0078805 A1 | 4/2004 | Brian et al. |
| 2004/0105004 A1 | 6/2004 | Rui et al. |
| 2004/0133635 A1 | 7/2004 | Spriestersbach et al. |
| 2004/0143602 A1 | 7/2004 | Ruiz et al. |
| 2004/0143630 A1 | 7/2004 | Kaufmann et al. |
| 2004/0201685 A1 | 10/2004 | Seaman et al. |
| 2004/0210333 A1 | 10/2004 | Lerner et al. |
| 2004/0236830 A1* | 11/2004 | Nelson et al. ................. 709/204 |
| 2004/0237032 A1 | 11/2004 | Miele et al. |
| 2004/0244039 A1 | 12/2004 | Sugahara et al. |
| 2004/0249650 A1 | 12/2004 | Freedman et al. |
| 2004/0263636 A1 | 12/2004 | Cutler et al. |
| 2005/0064935 A1 | 3/2005 | Blanco et al. |
| 2005/0114521 A1 | 5/2005 | Lee et al. |
| 2005/0216851 A1 | 9/2005 | Hull et al. |
| 2006/0005136 A1 | 1/2006 | Wallick et al. |
| 2006/0010095 A1 | 1/2006 | Wolff et al. |
| 2006/0041542 A1 | 2/2006 | Hull et al. |
| 2006/0041632 A1 | 2/2006 | Shoh et al. |
| 2006/0048058 A1* | 3/2006 | O'Neal et al. ................. 715/730 |
| 2006/0129576 A1 | 6/2006 | Carpentier et al. |
| 2006/0288273 A1 | 12/2006 | Erol et al. |
| 2007/0033419 A1 | 2/2007 | Kocher |
| 2007/0038935 A1 | 2/2007 | Hull et al. |
| 2007/0053004 A1 | 3/2007 | Calaway |
| 2008/0119235 A1* | 5/2008 | Nielsen et al. ................. 455/566 |

FOREIGN PATENT DOCUMENTS

| | | |
|---|---|---|
| JP | 08-125737 A | 5/1996 |
| JP | 10-246041 A | 9/1998 |
| JP | 11-298635 A | 10/1999 |
| JP | 2000/168294 A | 6/2000 |
| JP | 2002057981 A | 2/2002 |
| JP | 2003/009107 A | 1/2003 |
| JP | 2003/330354 A | 11/2003 |
| JP | 2005065262 A | 3/2005 |
| JP | 2007-004784 A | 1/2007 |
| KR | 2003-0097669 A | 12/2003 |
| KR | 2006-0133469 A | 12/2006 |
| WO | WO 02/13522 A2 | 2/2002 |
| WO | WO 02/058432 A2 | 7/2002 |
| WO | WO 03107347 A1 | 12/2003 |
| WO | WO 2004/059536 A2 | 7/2004 |

OTHER PUBLICATIONS

Notice of Allowance for U.S. Appl. No. 10/722,834, mailed on Nov. 30, 2009, 27 pages.

Final Office Action for U.S. Appl. No. 11/158,315, mailed on Mar. 2, 2010, 37 pages.

Non-Final Office Action for U.S. Appl. No. 11/158,315, mailed on Oct. 6, 2010, 31 pages.

Japanese Office Action for Application No. JP2004/340904, dated Oct. 26, 2010, 3 pages.

Japanese Office Action for Application No. JP2006-159896, dated Nov. 9, 2010, 9 pages.

Abowd et al., "Anchoring Discussions in Lecture: An Approach to Collaboratively Extending Classroom Digital Media," Computer Support for Collaborative Learning 1999, pp. 11-19, at URL: http://www.cc.gatech.edu/fce/eclass/pubs/csc199/final.htm.

Abowd et al., "Building a Digital Library of Captured Educational Experiences," Invited paper for the 2000 International Conference on Digital Libraries, Kyoto, Japan, Nov. 13-16, 2000, 8 pp.

Abowd et al., "Classroom 2000: A System for Capturing and Accessing Multimedia Classroom Experiences," 3 pages, printed on Mar. 11, 2005 at URL: http://www.cc.gatech.edu/fce/eclass/pubs/chi98/short/index.html.

Abowd et al., "Teaching and Learning as Multimedia Authoring: The Classroom 2000 Project," 1996, 12 pages, ACM Multimedia 1996, Boston, MA.

Addlesee et al., "The ORL Active Floor," IEEE pers. Comms., 1997, 14 pages, vol. 4, No. 5.

Adobe Premiere Real-Time editing for HD, SD, and DV, Adobe, pp. 1-2, printed on Jan. 18, 2007 at URL: http://www.adobe.com/products/premiere/index.html.

AVerMedia DVD EZmaker USB 2.0, 1 page, printed on Jan. 18, 2007, at URL: http://www.aver.com/2005home/product/videocapture/ezmakerusb2.0/ezmakerusb2.0.shtml.

Bilgen et al., "inSpace Projector: An Accessible Display System for Meeting Environments," 2 pages, at URL: http://www.cc.gatech.edu/pixi/pubs/ubicomp06-inspace-proj.pdf.

Brotherton et al., "Automated Capture, Integration, and Visualization of Multiple Media Streams," Proceedings of IEEE Multimedia '98, 1998, pp. 1-12, printed on Mar. 11, 2005 at URL: http://www.cc.gatech.edu/fee/eclass/pubs/ieee98, IEEE.

Brotherton, J. A., "Enriching Everyday Activities Through the Automated Capture and Access of Live Experiences—eClass: Building, Observing, and Understanding the Impact of Capture and Access in an Educational Domain," Ph.D. Thesis, Georgia institute of Technology, Jul. 2001, 287 pages, Jason Brotherton.

Chen et al., "Real-time Speaker Tracking Using Particle Filter Sensor Fusion," Proc. IEEE, Mar. 2004,13 pages, vol. 92, No. 3, IEEE.

Chiu et al., "LiteMinutes: An Internet-Based System for Multimedia Meeting Minutes," Proc. 10th World Wide Web Conference, May 2-5, 2001, 10 pages, printed on May 5, 2004, at URL: http://citeseer.ist.psu.edu/chiu01liteminutes.html.

Chiu et al., "NoteLook: Taking Notes in Meetings with Digital Video and Ink," Proceedings of ACM Multimedia 1999 Orlando, Florida, 10 pages, Nov. 1999.

Communication from the European Patent Office regarding European Application No. 04 024 390.9-1527, dated Jan. 12, 2006, 6 pages.

Communication from the European Patent Office regarding European Application No. 04 024 390.9-1527, dated Mar. 2, 2007, 5 pages.

Communication from the European Patent Office regarding European Application EP 04255836.1, dated Jun. 11, 2007, 10 pages.

Cruz et al., "Capturing and Playing Multimedia Events with Streams," ACM Multimedia 1994, 8 pages, San Francisco, CA, 1994.

Cunado et al., "Gait Extraction and Description by Evidence-Gathering," 1999, pp. 43-48, at URL: http://eprints.ecs.soton.ac.uk/638/2/cunadonash.pdf.

Cutler et al., "Distributed Meetings: A Meeting Capture and Broadcasting System," ACM Multimedia, 2000, 10 pages.

Davis et al., "A Framework for Sharing Handwritten Notes," Proceedings of UIST '98, pp. 119-120, Nov. 1998, ACM, San Francisco, CA.

Denoue, et al., "ProjectorBox; Seamless Presentation Capture for Classrooms," World Conference on E-Learning in Corporate, Government, Healthcare, & Higher Education, Oct. 24, 2005, 6 pages, E-Learn 2005.

Eldridge, et al, "Does a Video Diary Help Recall?" Technical Report EPC-1991-124, 1992, pp. 257-269, Rank Xerox Ltd., Cambridge, U.K.

Elrod et al., "Liveboard: A Large Interactive Display Supporting Group Meetings, Presentations and Remote Collaboration," CHI '92, May 3-7, 1992, pp. 599-607, AMC.

Erol et al., "Multimodal Summarization of Meeting Recordings," ICME, 2003, 4 pages.

Foote et al., "An Intelligent Media Browser Using Automatic Multimodal Analysis," ACM Multimedia, 1998, pp. 375-380, ACM Multimedia, Bristol U.K.

Girgensohn, "Time-Constrained Keyframe Selection Technique," Multimedia Tools and Applications, 2000, pp. 347-358, Kluwer Academic Publishers, Netherlands.

Gross et al., "Towards a Multimodal Meeting Record," ICME, 2000, 4 pages, New York.

Hilbert, et al., "Seamless Capture and Discovery for Corporate Memory," The 15th International World Wide Web Conference, May 22-26, 2006, 10 pages, IW3C2, Edinburgh, U.K.

Hilbert, et al., "Seamless Presentation Capture, Indexing, and Management," Internet Multimedia Management Systems VI, Oct. 26, 2005, 9 pages.

Hu et al., "Audio Hot Spotting and Retrieval Using Multiple Audio Features and Multiple ASR Engines," HLT-NAACL 2004 Workshop on Interdisciplinary Approaches to Speech Indexing and Retrieval, 2004, 6 pages.

ICSI Meeting Recorder Project: Recording software, pp. 1-3, printed on Jan. 18, 2007, at URL: http://www.icsi.berkeley.edu/—dpwe/research/mtgrcdr/rcd-sw.html.

"Interact, Annotate, Engage—Interwrite Pad," Brochure, 2 pages, Interwrite Learning.

Jaimes et al., "Memory Cues for Meeting Video Retrieval," ACM CARPE Workshop 2004, Oct. 15, 2004, pp. 74-85, ACM, New York, NY.

Konneker, "Automating Receptionists," Proceedings of the 1986 IEEE International Conference on Systems, Man and Cybernetics, Oct. 14-17, 1986, pp. 1592-1596, IEEE.

Lamming et al., "Activity-based Information Retrieval: Technology in Support of Personal Memory," Personal Computers and Intelligent Systems, Information Proceedings 92, 1992, pp. 68-81, vol. 3, IFIP.

Lee et al., "MinuteAid: Multimedia Note-Taking in an Intelligent Meeting Room," IEEE International Conference on Multimedia and Expo (ICME), Taipei, Taiwan, Jun. 27-30, 2004, 4 pages, IEEE.

Lee et al., "Portable Meeting Recorder," ACM Multimedia, 2002, Dec. 1-6, 2002, pp. 493-502, ACM, Juan Les, France.

Lovstrand, "Being Selectively Aware with the Khronika System," Proceedings of the Second European Conference on Computer-Supported Cooperative Work, Sep. 25-27, 1991, pp. 265-77.

Meet?ng Room, An Interactive Systems Labs Project, 1 page, printed on Jan. 18, 2007 at URL: http://www.is.cs.cmu.edu/meeting_room/browser/browser_toprint.html.

Minneman et al., "A Confederation of Tools for Capturing and Accessing Collaborative Activity," ACM Multimedia 1995, 10 pages, San Francisco, CA.
Minneman et al., "Where Were We: Making and Using Near-synchronous, Pre-narrative Video," ACM Multimedia, 1993, 9 pages.
Moran et al., "Tivoli: Integrating Structured domain Objects into a Freeform Whiteboard Environment," Proceedings of International Conference on Human Factors in Computer Systems (CHI), Apr. 1-6, 2000, pp. 20-21.
Nair, R., "Calculation of an Aggregated Level of Interest Function for Recorded Events," MM '04, Oct. 10-16, 2004, 4 pages, ACM Multimedia.
Newman et al., "PEPYS: Generating Autobiographies by Automatic Tracking," Proceedings of the Second European Conference, Sep. 25-27, 1991, pp. 175-188.
Nishimura et al., "Indexing of human motion at meeting room by analyzing time-varying images of omni-directional camera," Conference on Computer Vision, 1:1-4 (2000).
"No Need for Wires! Micronet SP925 Wireless Projector Server Brings Presentation Freedom and Efficiency without Compromising Security," Partner eNews, Nov. 9, 2007, 2 pages, Micronet Communications Inc.
Nuance—ScanSoft Imaging Solutions, p. 1, printed on Jan. 18, 2007 at URL: http://www.nuance.com/scansoft/.
Pedersen et al., "Tivoli: An Electronic Whiteboard for Informal Workgroup Meetings," Proceedings of International Conference on Human Factors in Computer Systems (CHI '93), Apr. 24-29, 1993, 8 pages, ACM, New York.
Pimental et al., "Linking by Interacting: a Paradigm for Authoring Hypertext," Proceedings of ACM Hypertext 2000, May 2000, 11 pages, San Antonio, TX.
Plamondon et al., "Automatic Signature Verification and Writer Identification—The State of the Art," Pattern Recognition, 1989, pp. 107-131, vol. 22, No. 2.
Price et al., "linking by Inking: Trailblazing in a Paper-like Hypertext," ACM Hypertest 1998, 10 pages, Pittsburg, PA.
Product Description for Meeting Companion by Quindi Corporation, 2004, 8 pages, printed on Jan. 24, 2005, at URL: http://quindi.com/product.htm.
Rangan, "Software Implementation of VCRs on Personal Computing Systems," IEEE Transactions on Consumer Electronics, Aug. 1992, pp. 635-640, vol. 38, No. 3, IEEE.
Rangan et al., "A Window-Based Editor for Digital Video and Audio," IEEE 1992, pp. 640-648, IEEE.
Rosenschein, "New Techniques for Knowledge Capture," TTI/Vanguard Conference: Knowledge Management Comes of Age, Sep. 23-24, 2003 Washington D.C., Sep. 23-24, 2003, pp. 1-3, TTI/Vanguard.
Rui et al., "Automating lecture capture and broadcast: technology and videography," ACM Multimedia Systems Journal, 2004, pp. 1-13, vol. 10, Multimedia Systems.
Schneier et al., "Cryptograpgic Support for Secure Logs on Untrusted Machines," Proceedings of the 7th USENIX Security Symposium, Jan. 26-29, 1998, 11 pages, USENIX, San Antonio, TX.
Smart Lobby: The Electronic Sign-In Book That Tracks Visitors and Prints Badges, User Guide for Windows, Seiko Instruments, Inc., 1997, 43 pages, Seiko Instruments USA, Inc., San Jose CA.
Smart SB685ix, Product Information, 1 page, SmartBoards.com.
Song et al., "PVCAIS: A Personal Videoconference Archive Indexing System," ICME 2003, pp. 673-676, IEEE.
Sony EVI-D100 Pan/Tilt/Zoom Color Video Camera, Picture Phone Direct, pp. 1-2, printed on Jan. 18, 2007, at URL: http://www.picturephone.com/products/sony_evid100.htm.
Sony Music Corporation, "E-Guide Unmanned Reception System," Japan Industrial Journal, May 20, 1996, p. 6.
Stifelman, L., "The Audio Notebook: Paper and Pen Interaction with Structured Speech," PhD Thesis, Sep. 1997, 150 pages, MIT 1997.
Stifelman et al., "The Audio Notebook," CHI 2001, Mar. 31-Apr. 5, 2001, 8 pages, vol. 3, No. 1, Seattle, WA.
Systran® Language Translation Technologies, p. 1, printed on Jan. 18, 2007, at URL: http://www.syttransoft.com/index.html.
Truong et al., "Architectural Support for Building Automated Capture & Access Applications," Oct. 20, 2003, 10 pages, printed on Feb. 4, 2005, at URL: http://web.archive.org/web/20031020022039/http://www.cc.gatech.edu/classes/AY2004/cs4470_fall/readings/inca-icse03.
Truong et al., "Personalizing the Capture of Public Experiences," Proceedings of UIST 1999, Nov. 1999, 11 pages, ACM, Asheville, NC.
Uchihashi et al., "Video Magna: Generating Semantically Meaningful Video Summaries," Proc. Multimedia 1999, 10 pages.
Viredaz M.A., "The Itsy Pocket Computer Version 1.5: User's Manual," Technical Note TN-54, Compaq Western Research Laboratory, Jul. 1998, pp. 1-37, Digital Western Research Laboratory, Palo Alto, CA.
Want et al., "The Active Badge Location System," ACM Transactions on Information Systems, Jan. 1992, pp. 91-102, vol. 10, No. 1.
Weber et al., "Marquee: A Tool for Real-Time Video Logging," CHI '94, Apr. 24-28, 1994, 8 pages, Boston, MA.
WebEx: Web Conferencing, Online Meetings, and Video Conferencing, 1 page, printed on Jan. 18, 2007, at URL: http://www.webex.com.
Whittaker et al., "Filochat: handwritten notes provide access to recorded conversations," Human Factors in Computing Systems Proceedings of CHI '94, Apr. 24-28, 1994, pp. 271-277, ACM Press, Boston, MA.
Wilcox et al., "Dynomite: A Dynamically Organized Ink and Audio Notebook," CHI 1997 Conference Proceedings, Mar. 22-27, 1997, pp. 186-193, ACM Press, Atlanta GA.
Non-Final Office Action for U.S. Appl. No. 09/714,785, mailed Apr. 9, 2003, 27 pages.
Final Office Action for U.S. Appl. No. 09/714,785, mailed Sep. 17, 2003, 25 pages.
Advisory Action for U.S. Appl. No. 09/714,785, mailed Nov. 26, 2003, 3 pages.
Non-Final Office Action for U.S. Appl. No. 09/714,785, mailed Mar. 5, 2004, 25 pages.
Final Office Action for U.S. Appl. No. 09/714,785, mailed Dec. 7, 2004, 33 pages.
Final Office Action for U.S. Appl. No. 09/714,785, mailed Jul. 12, 2005, 8 pages.
Notice of Allowance for U.S. Appl. No. 09/714,785, mailed Nov. 1, 2005, 4 pages.
Non-Final Office Action for U.S. Appl. No. 11/250,780, mailed Jul. 27, 2007, 13 pages.
Final Office Action for U.S. Appl. No. 11/250,780, mailed May 30, 2008, 31 pages.
Non-Final Office Action for U.S. Appl. No. 09/728,560, mailed May 23, 2003.
Interview Summary for U.S. Appl. No. 09/728,560, mailed Oct. 30, 2003.
Notice of Allowance for U.S. Appl. No. 09/728,560, mailed Nov. 4, 2003.
Interview Summary for U.S. Appl. No. 09/728,560, mailed Jan. 21, 2004.
Notice of Allowance for U.S. Appl. No. 09/728,560, mailed Nov. 22, 2004.
Notice of Allowance for U.S. Appl. No. 09/728,560, mailed Dec. 16, 2005.
Non-Final Office Action for U.S. Appl. No. 11/389,513, mailed Jun. 25, 2008, 15 pages.
Final Office Action for U.S. Appl. No. 11/389,513, mailed Mar. 3, 2009, 23 pages.
Notice of Allowance for U.S. Appl. No. 11/389,513, mailed Sep. 1, 2009, 27 pages.
Non-Final Office Action for U.S. Appl. No. 09/728,453, mailed Dec. 1, 2004, 27 pages.
Final Office Action for U.S. Appl. No. 09/728,453, mailed Sep. 21, 2005, 14 pages.
Advisory Action for U.S. Appl. No. 09/728,453, mailed Feb. 22, 2006, 4 pages.
Non-Final Office Action for U.S. Appl. No. 09/728,453, mailed Aug. 27, 2007, 12 pages.
Final Office Action for U.S. Appl. No. 09/728,453, mailed Apr. 15, 2008, 17 pages.

Non-Final Office Action for U.S. Appl. No. 09/728,453, mailed Dec. 23, 2008, 17 pages.
Non-Final Office Action for U.S. Appl. No. 09/521,252, mailed Jan. 20, 2004, 13 pages.
Non-Final Office Action for U.S. Appl. No. 09/521,252, mailed Oct. 21, 2004, 17 pages.
Interview Summary for U.S. Appl. No. 09/521,252, mailed Nov. 23, 2004, 3 pages.
Final Office Action for U.S. Appl. No. 09/521,252, mailed Jun. 2, 2005, 16 pages.
Advisory Action for U.S. Appl. No. 09/521,252, mailed Oct. 12, 2005, 4 pages.
Non-Final Office Action for U.S. Appl. No. 09/521,252, mailed Jan. 6, 2006, 16 pages.
Final Office Action for U.S. Appl. No. 09/521,252, mailed Oct. 5, 2006, 14 pages.
Interview Summary for U.S. Appl. No. 09/521,252, mailed Mar. 16, 2007, 3 pages.
Interview Summary for U.S. Appl. No. 09/521,252, mailed Jul. 17, 2007, 1 pages.
Notice of Allowance for U.S. Appl. No. 09/521,252, mailed Jul. 17, 2007, 10 pages.
Non-Final Office Action for U.S. Appl. No. 10/722,834, mailed Jun. 22, 2007, 14 pages.
Final Office Action for U.S. Appl. No. 10/722,834, mailed Dec. 13, 2007, 14 pages.
Interview Summary for U.S. Appl. No. 10/722,834, mailed Feb. 14, 2008, 2 pages.
Advisory Action for U.S. Appl. No. 10/722,834, mailed Mar. 4, 2008, 3 pages.
Non-Final Office Action for U.S. Appl. No. 10/722,834, mailed May 13, 2008, 16 pages.
Final Office Action for U.S. Appl. No. 10/722,834, mailed Nov. 13, 2008, 14 pages.
Advisory Action for U.S. Appl. No. 10/722,834, mailed Jan. 21, 2009, 6 pages.
Interview Summary for U.S. Appl. No. 10/722,834, mailed Mar. 30, 2009, 3 pages.
Non-Final Office Action for U.S. Appl. No. 10/722,834, mailed Jun. 9, 2009, 15 pages.
Non-Final Office Action for U.S. Appl. No. 11/158,315, mailed Jul. 30, 2008, 32 pages.
Final Office Action for U.S. Appl. No. 11/158,315, mailed Jan. 26, 2009, 30 pages.
Interview Summary for U.S. Appl. No. 11/158,315, mailed Feb. 17, 2009, 2 pages.
Advisory Action for U.S. Appl. No. 11/158,315, mailed Apr. 15, 2009, 4 pages.
Non-Final Office Action for U.S. Appl. No. 11/158,315, mailed Jul. 9, 2009, 27 pages.
Non-Final Office Action for U.S. Appl. No. 11/158,313, mailed Nov. 14, 2008, 33 pages.
Notice of Allowance for U.S. Appl. No. 11/158,313, mailed Apr. 9, 2009, 14 pages.
Requirement for Restriction/Election for U.S. Appl. No. 10/887,998, mailed Mar. 30, 2007, 10 pages.
Non-Final Office Action for U.S. Appl. No. 10/887,998, mailed Jul. 12, 2007, 8 pages.
Final Office Action for U.S. Appl. No. 10/887,998, mailed Jan. 8, 2008, 8 pages.
Non-Final Office Action for U.S. Appl. No. 10/887,998, mailed Jul. 28, 2008, 8 pages.
Final Office Action for U.S. Appl. No. 10/887,998, mailed Dec. 22, 2008, 9 pages.
Advisory Action for U.S. Appl. No. 10/887,998, mailed Mar. 6, 2009, 3 pages.
Non-Final Office Action for U.S. Appl. No. 10/887,998, mailed May 11, 2009, 12 pages.
Interwrite Pad, Interwrite Learning Product, copyright 2007, printed on Feb. 23, 2011, at URL: http://web.archive.org/web/20071014002820/http://interwritelearning.com/products/pad/detail.html#section-3, 2 pages.
Non-Final Office Action for U.S. Appl. No. 11/158,315, mailed on Mar. 18, 2011, 20 pages.
Final Office Action for U.S. Appl. No. 11/158,315 mailed on Sep. 15, 2011, 21 pages.
Advisory Action for U.S. Appl. No. 11/158,315 mailed on Dec. 2, 2011, 4 pages.
Non-Final Office Action for U.S. Appl. No. 11/158,315 mailed on Sep. 19, 2012, 19 pages.

* cited by examiner

TECHNIQUES FOR FACILITATING ANNOTATIONS

BACKGROUND OF THE INVENTION

Embodiments of the present invention relate to processing of multimedia information, and more particularly to techniques for enabling one or more users to annotate information, such as video information.

Multimedia presentations are commonly used to convey information during presentations and meetings. For example, PowerPoint slide presentations are commonly used in academic, commercial, and private environments to disseminate information. In a typical presentation setup, a computer such as a laptop executing the presentation is connected to an output device such as a monitor or projector. Video information (and possibly other types of information) generated from executing the presentation application is then piped to the output device to be displayed by the output device.

Even with the proliferation of multimedia presentations, the ability of an attendee at the meeting to interact with the presentation is still very limited. For example, there are no simple solutions that enable attendees of the meeting to annotate or provide feedback on a slide being presented at the meeting.

BRIEF SUMMARY OF THE INVENTION

Embodiments of the present invention provide techniques for facilitating annotation of information. Techniques are provided that enable one or more users to annotate video information being displayed by an output device. Different annotation modes may be provided. For example, in one mode, a device is provided that can capture a video frame from video information being output by an output device. One or more users may then annotate the captured video frame. The annotations may be communicated to the output device such that the output displays the captured video frame along with annotations made to the video frame. Other annotation modes are also provided.

According to an embodiment of the present invention, techniques are provided for facilitating annotations. An annotations system is configured to capture a video frame from a video stream received by the annotations system from a video source device, wherein the capturing is performed in response to a request received by the annotations system from a client device in a set of one or more client devices, the captured video frame corresponding to a video frame being displayed by an output device. The annotations system enables the captured video frame to be annotated using a client device from the set of client devices.

In one embodiment, annotations system receives a set of one or more annotations from one or more client devices in the set of client devices, the set of one or more annotations comprising annotations for the captured video frame made using one or more client devices from the set of client devices. The annotations system may communicate the set of annotations and the captured video frame from the first device to multiple client devices in the set of client devices thereby enabling the multiple client devices receiving the captured video frame and the set of annotations to display the captured video frame with the set of annotations overlayed on the captured video frame.

In one embodiment, the annotations system is configured to generate an overlayed image comprising the captured video frame with the set of annotations overlayed on the captured video frame, and communicate the overlayed image to the multiple client devices in the set of client devices.

In one embodiment, the annotations system is configured to communicate the set of annotations to the output device thereby causing the output device to display the captured video frame with the set of annotations overlayed on the captured video frame.

In one embodiment, the annotations system is configured to capture one or more video frames from the video stream received from the video source device, the one or more video frames including the video frame captured in response to the request received from the client device. The annotations system may then generate a document comprising the one or more video frames and the first set of annotations.

In one embodiment, wherein the set of annotations received by the annotations system may comprise annotations received from multiple client devices from the set of client devices. The annotations system may communicate the set of annotations to the output device thereby causing the output device to display the captured video frame with the set of annotations overlayed on the captured video frame.

In one embodiment, the annotations system may receive the request from a first client device from the set of client devices and, in response to the request, communicate the captured video frame to only the first client device. The annotations system may receive a set of one or more annotations from the first client device, the set of annotations representing annotations made to the captured video frame using the first client device. The annotations system may store the set of one or more annotations.

According to one embodiment, annotations system may provide a server that provides an interface that enables a video frame captured by the annotations system to be annotated by a client device from the set of client devices. The annotations system may also enable an application to be downloaded from the annotations system to a client device from the set of client devices, wherein the application enables the client device receiving the application to annotate the captured video frame.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Figure 1:
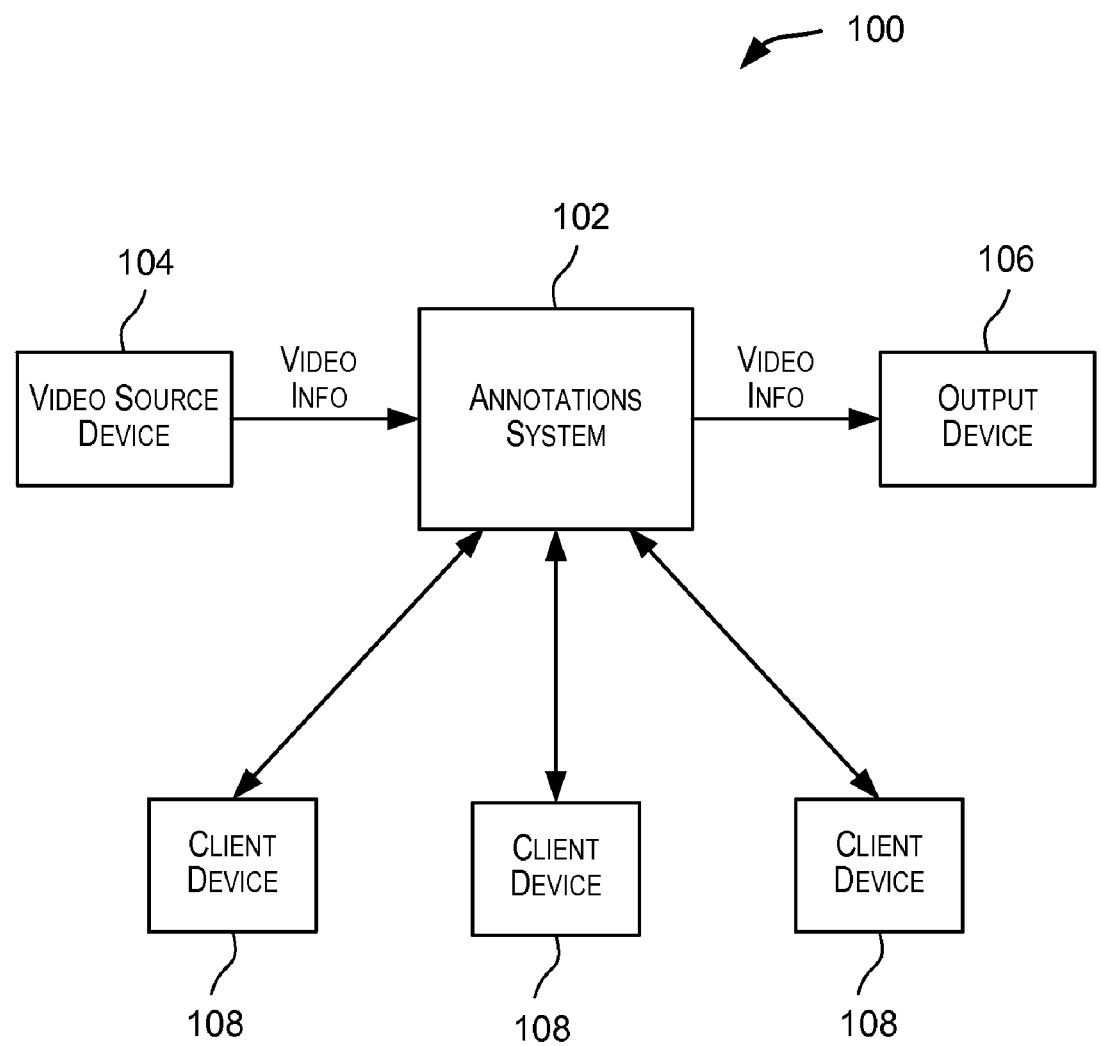
FIG. 1 is a simplified block diagram of a system incorporating an embodiment of the present invention.

FIG. 1 is a simplified block diagram of a system 100 incorporating an embodiment of the present invention. As shown in FIG. 1, system 100 comprises an annotations system or device (AS) 102, a video source device 104, an output device 106, and one or more client devices 108. Video source device 104 may be any device that is capable of providing a stream of video information. For example, video source device 104 may be a computer that provides a stream of video information. The video stream may be generated as a result of an application executing on video source device 104. For example, video source device 104 may execute an application such as Microsoft's PowerPoint that is capable of outputting presentations of slides. The video stream generated as a result of the PowerPoint application may be output by video source device 104 and communicated to AS 102. Other examples of applications that may result in generation of video information include KeyNote, QuickTime, media players of different types, a Flash application, a web browser, other presentation software, or other application that causes information to be output and the output information may be displayed using an output device.

Output device 106 may be any device capable of outputting information. In one embodiment, the information that is output by output device 106 is received from AS 102. For example, AS 102 may communicate video information to output device 106 that may then be output by output device 106. In one embodiment, AS 102 receives a video stream from video source device 104 and communicates the received video stream to output device 106 for display by output device 106. The information that is output by output device 106 may be video information, audio information, images, etc. Examples of output device 106 include a projector, a monitor, a television, and the like.

AS 102 is configured to facilitate annotations to information output by output device 106. In one embodiment, AS 102 provides various modes in which annotations may be made. In one mode, users of client devices 108 may collaboratively annotate information output by video source device 104 and that is output by output device 106. As depicted in FIG. 1, AS 102 is communicatively coupled to both video source device 104 and output device 106. In one embodiment, as depicted in FIG. 1, AS 102 is configured to receive video information from video source device 104 and communicate the received video information to output device 106 such that video information provided by video source device 104 can be output by output device 106.

There are various ways in which AS 102 may be communicatively coupled with video source device 104 and output device 106 including ways that use wired or wireless technologies, or combinations thereof The type of communication link between AS 102 and video source device 104 may be the same as or different from the type of communication link between AS 102 and output device 106. Various different protocols may be used to facilitate the communications between video source device 104 and AS 102 and between AS 102 and output device 106.

In one embodiment, AS 102 is configured to receive requests or commands from client devices 108 and to perform one or more operations in response to the requests. These requests may include for example requests to enter modes that enable users of client devices 108 to annotate information provided by video source device 104 and that is output by output device 106. The requests for performing annotations may be received from one or more client devices 108. For example, video source device 104 may execute a PowerPoint application displaying a slide presentation. The video information resulting from the PowerPoint presentation may be output by output device 106. In such a scenario, AS 102 enables users of client devices 108 to annotate the displayed slides. Further details related to how the annotations are enabled are provided below. It should be apparent that embodiments of the present invention are not restricted to PowerPoint presentations. In general, AS 102 enables users of client devices 108 to annotate information that is received by AS 102 from video source device 104 and information that is output by output device 106.

In addition to enabling annotations, AS 102 may also be configured to perform other operations. These operations may be performed in response to requests received from one or more client devices 108. For example, in one embodiment, AS 102 may be configured to receive video information from video source device 104, format the video information to an appropriate format that can be handled by output device 106, and then send the formatted video information to output device 106. In this manner, AS 102 enables information from video source device 104 to be output by output device 106 even if the format of information output by video source device 104 is not compatible with the format of information that output device 106 can output. A user may also use a client device 108 to request AS 102 to capture one or more video frames from the stream of video information received by AS 102 from video source device 104. A user may also use a client device 108 to request AS 102 to create electronic documents based upon the received video information from video source device 104. In one embodiment, AS 102 may create an electronic document comprising video frames captured by AS 102. If a video frame included in the electronic document has been annotated, then the annotations may also be included in the electronic document. In one embodiment, the annotations may be overlayed on the video frame in the electronic document. In this manner, the electronic document that is created by AS 102 shows not just the captured video frames but also any annotations made to the video frames. A user of a client device 108 may also request AS 102 to perform other operations.

In one embodiment, in order to user the services provided by AS 102, a client device 108 has to register with AS 102. In such an embodiment, AS 102 provides a mechanism by which a client device 108 may register and un-register with AS 102. One or more client devices 108 may be registered with AS 102 at any time. Only the registered client devices are then permitted to request operations using AS 102, including the ability to annotate video information. For example, an AS 102 may be located in a conference room. During a meeting held in the conference room, attendees of the meeting may register their client devices with the AS located in the conference room. This enables users of the registered client devices to request operations to be performed by the AS located in the conference room, including requests to perform annotations for a slide presentation during the meeting. At the end of the meeting, the users may de-register their client devices. In one embodiment, for enhanced security, AS 102 may automatically de-register a previously registered client device if the client device has not communicated with the AS for a period of time, or if the distance between the client device and AS 102 exceeds a certain user-configurable threshold, or using some other technique. For example, the AS 102 located in a conference room may be configured such that only those client devices that are within the conference room can register with the AS.

Client devices 108 are devices or systems that can be used to send commands or requests to AS 102 requesting one or more operations to be performed or enabled by AS 102. For example, a user may use a client device 108 to annotate video information provided by video source device 104 and output by output device 106. A client device 108 may comprise an input subsystem (e.g., a stylus, a mouse, a keyboard, etc.) that enables a user to input information and make operation requests. For example, a user may use a stylus of a client device 108 to send a request to enable annotation of the video information and also to make the annotations. Other operations may also be initiated using the stylus and the client device. A client device 108 may also comprise an output subsystem (e.g., display, monitor) that enables information to be output to the user of the client device.

Various different types of devices may be used as client devices 108. These devices include but are not restricted to various types of computers, laptops, PDAs, tablet computers, mobile devices, E-Ink technology devices that use microspheres having at least two reflectance states to display information (e.g., some types of tablet computers, document readers such as the Kindle device provided by Amazon), remote control devices, etc. In general, any device that can be configured to communicate with AS 102 and request the AS to perform operations may be used as a client device 108. In one embodiment, a tablet computer that uses E-Ink to display information may be used as a client device 108. Such a tablet device may use E-Ink to display information and provide the user the ability to annotate the displayed information using pen/paper like interaction using an input device such as a digital pen or stylus.

In one embodiment, AS 102 may also provide an interface, such as a web interface, that can be accessed by client devices 108 to perform various operations. For example, client devices 108 may use this web interface to make annotations.

AS 102 is configured to provide different modes in which video information received from video source device 104 and output by output device 106 can be annotated. In one embodiment, a "shared mode" and a "private mode" are provided. In the shared mode, multiple users are able to collaboratively annotate the video information and annotations made by one user are shared with other users. A user using a client device may send a request to AS 102 for annotations to be performed in a shared mode. In one embodiment, upon receiving such a request, AS 102 is configured to capture the video frame or image presently being output or displayed by output device 106. AS 102 then continues to send video information comprising the video frame to output device 106 thereby freezing the output of output device 106 to display the captured video frame. In some embodiments, the video information received by AS 102 from video source device 104 may be stopped as part of the freezing process. AS 102 may also send the captured video frame to the registered client devices for display by the client devices. One or more users of the client devices may then annotate the captured video frame using their client devices. For example, a user using a tablet computer may use the tablet's stylus to annotate the captured video frame displayed on the tablet's display. The annotations made by a client device are communicated from the client device to AS 102. Since multiple users may make annotations in the shared mode, AS 102 may receive annotations from multiple client devices 108. AS 102 is configured to communicate the received annotations to the client devices such that the annotations are displayed on the captured video frame displayed by the client devices. AS 102 may also communicate the received annotations to output device 106 such that the information output by output device 106 displays the captured video frame with the annotations overlayed on it. In one embodiment, AS 102 generates an overlayed image by overlaying the annotations received from client devices 108 on the captured video frame. The overlayed image thus created is then communicated from AS 102 to output device 106 or to client devices 108 for display. In this manner, in the shared mode, multiple users may annotate the video information and the annotated information is shared among the multiple users. The shared mode thus provides a mode in which collaborative annotations may be performed by users of client devices 108. Normal display of the video information by output device 106 (i.e., unfreezing of the video information) may be resumed after the shared mode has been exited.

In the private mode, annotations made by a user of a client device are not shared with other users. In this mode, annotations made by a user are kept private for that user. A user may use a client device to send a request to AS 102 requesting enabling annotations to be performed in a private mode. In one embodiment, upon receiving such a request, AS 102 is configured to capture the video frame or image presently being displayed by output device 106. However, unlike the shared mode, the video information being displayed to the users is not frozen. The captured video frame may then be sent to the client device requesting the private mode for display by the client device. The user of the requesting client device may then provide annotations to the captured video frame using the client device. For example, a user using a tablet computer may use the tablet's stylus to annotate the captured video frame displayed on the tablet's display. The annotations are displayed on the user's client device overlayed on the captured image. The annotations may also be communicated from the client device to AS 102. AS 102 may then store the annotations. In this manner, the annotations are only displayed to the requesting user and not shared with the other users. AS 102 can participate in multiple private mode sessions with individual client devices at any time.

There are various situations in which a user may use a private mode for annotations. For example, the user may want to annotate the information for the user's personal notes. Since AS 102 receives the user's annotations, at the end of a presentation, AS 102 may compile an electronic document for the user comprising video frames captured from the video information along with annotations provided by the user.

In one embodiment, AS 102 also provides the capability to switch between annotation modes, for example, from the private mode to the shared mode. For example, a user in private mode may wish to share the user's annotations with the rest of the users. While in private mode, the user may send a request (using the user's client device) to AS 102 to switch the mode from private mode to shared mode. Upon receiving such a request, AS 102 is configured to send information to output device 106 such that the video frame captured and possibly annotated by the user in private mode is output by output device 106. In this manner, the output of output device 106 is frozen to display the captured video frame. The captured frame may also be sent by AS 102 to the registered client devices for display by the client devices and enabling one or more users of the client devices to annotate the captured video frame. Annotations made by the user in private mode may also be communicated to the output device 106 and/or to the client devices 108 such that the output device and the client devices can display the captured video frame along with the annotations to the captured video frame made by the user in private mode.

It should be noted that, in embodiments of the present invention, the video source device 104 and/or output device 106 do not have to be specially configured or modified in any way to enable the annotation feature. There is no special hardware or software needed on video source device 104 or output device 106 to support the annotation feature. The software and hardware for supporting annotations is fully provided by AS 102. In this manner, AS 102 provides a convenient and pluggable solution to annotate displayed information, without requiring any specialized hardware or software on video source device 104 or output device 106 or even on client devices 108. This not only enhances the usability of AS 102 but also enables it to be used in various environments. AS 102 can be easily used in any setting or environment where information is being displayed to one or more users and users desire to annotate the displayed information. Examples include during reviews of documents (e.g., during code reviews), for teaching in a classroom-type of setting, for website walk-throughs, or other settings that involve users making annotations or providing feedback on information that is displayed.

In the embodiment depicted in FIG. 1, AS 102 is shown as being separate from video source device 104 and output device 106. In an alternative embodiment, AS 102 may be integrated into output device 106.

Figure 2:
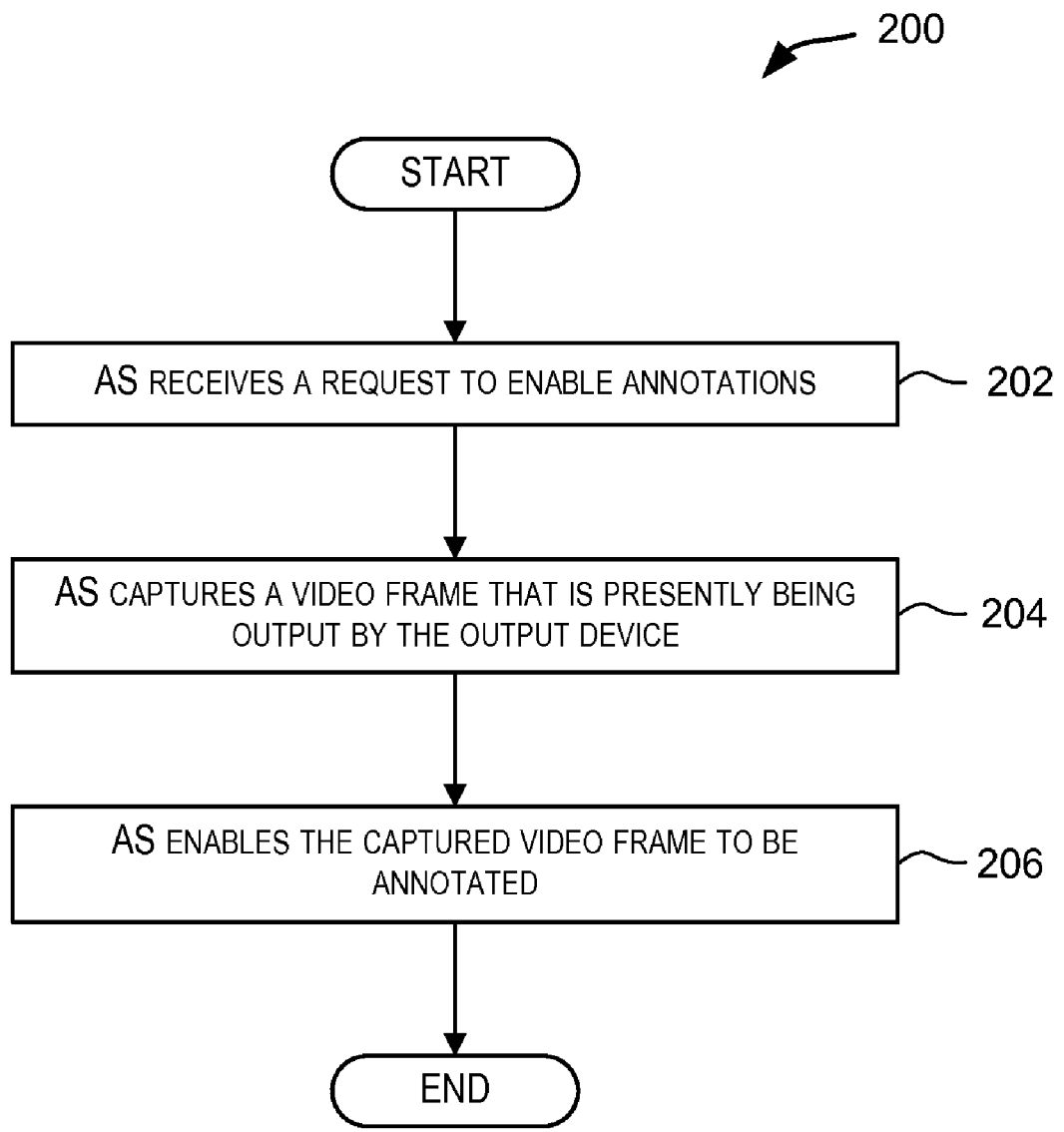
FIG. 2 is a simplified flowchart depicting a method of enabling annotations according to an embodiment of the present invention.

FIG. 2 is a simplified flowchart 200 depicting a method of enabling annotations according to an embodiment of the present invention. The method depicted in FIG. 2 may be implemented in software (e.g., program, code, instructions executed by a processor of AS 102), or hardware of AS 102, or combinations thereof. The software may be stored on a computer-readable storage medium. The method may be performed in a system such as system 100 depicted in FIG. 1.

As depicted in FIG. 2, the method is initiated when AS 102 receives a request to enable annotations (step 202). The request may be received from one or more client devices 108. In one embodiment, only those client devices that are registered with AS 102 are able to send the request received in 202. In one embodiment, the request received in 202 may also indicate a particular mode (e.g., shared mode, private mode, etc.) in which the annotations are to be performed. In other embodiments, a default mode (typically the shared mode) may be provided.

In response to the request received in 202, AS 102 is configured to capture a video frame that is presently being displayed by an output device (step 204). AS 102 is then configured to enable the captured video frame to be annotated (step 206). The annotations may be enabled in a particular mode such as a private mode or shared mode. As part of 206, the video frame captured in 204 is made available for annotations by one or more client devices 108.

Figure 3:
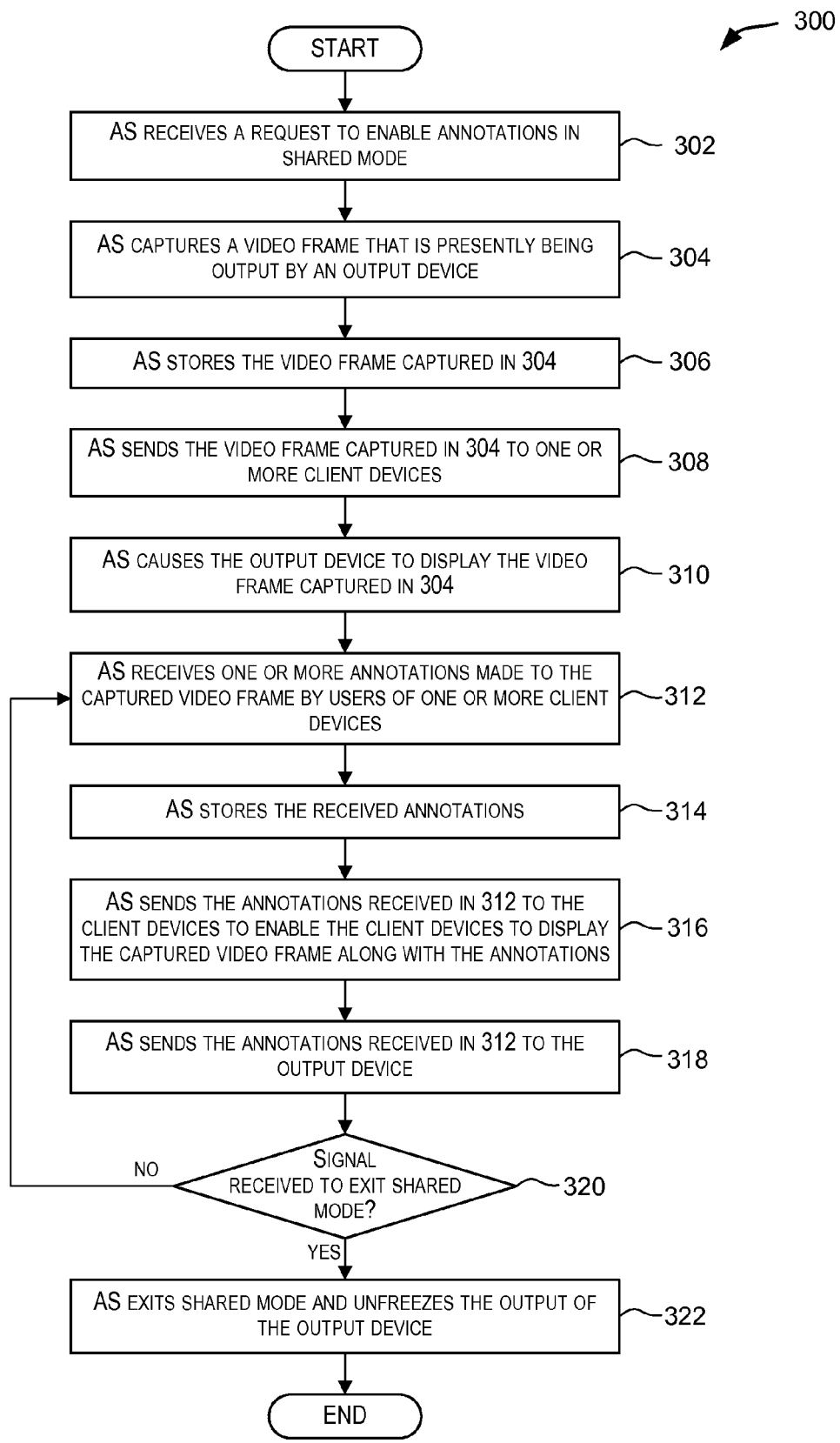
FIG. 3 is a simplified flowchart depicting a method of enabling and processing annotations in shared mode according to an embodiment of the present invention.

FIG. 3 is a simplified flowchart 300 depicting a method of enabling and processing annotations in shared mode according to an embodiment of the present invention. The method depicted in FIG. 3 may be implemented in software (e.g., program, code, instructions executed by a processor of AS 102), or hardware of AS 102, or combinations thereof. The software may be stored on a computer-readable storage medium. The method may be performed in a system such as system 100 depicted in FIG. 1.

As depicted in FIG. 3, the method is initiated when AS 102 receives a request to enable annotations in shared mode (step 302). The request may be received from one or more client devices 108. In one embodiment, only those client devices that are registered with AS 102 are permitted to send the request.

In response to the request, AS 102 is configured to capture a video frame that is presently being output by an output device (step 304). The captured video frame may also be stored by AS 102 (step 306). As part of 306, AS 102 may also store metadata information related to the captured video frame such as the date and time of the capture, information identifying a client device that triggered the capture, and the like.

AS 102 may then send the video frame captured in 304 to one or more client devices that are registered with AS 102 (step 308). The communication may be performed using wireless technologies, wired technologies, or combinations thereof. The video frame may be communicated in a format that the individual client device is able to handle. For example, the display resolutions on the client devices may be different. For a particular client device, AS 102 is configured to format the captured video frame to a format that the client device can handle and then communicate the formatted captured video frame to the client device. This allows client devices with different capabilities to use the services provided by AS 102 and to collaboratively perform annotations. Because the captured video frames and annotations are stored on AS 102 and passed to the client devices, there is no need for the client devices to have the same screen size, color depth, etc. This allows color images to be annotated using a client device with a monochrome display. AS 102 may also automatically scale the annotations so that, for example, a printable PDF document may be annotated on a client device with a smaller screen.

AS 102 may then cause the output device to display the captured video frame (step 310). In one embodiment, this is done by continually sending video information comprising the captured frame information to the output device causing the output device to display the captured frame. Accordingly, instead of feeding output device 106 with information received by AS 102 from video source device 104, AS 102 keeps sending information comprising the captured video frame. The video information received by AS 102 from the video source device 104 may also be temporarily paused.

A client device receiving the captured video frame from AS 102 may display the captured video frame on the client device's display and enable the user of the client device to annotate the displayed captured video frame. One or more users of the client devices may then make annotations to the captured video frame. The annotations may be made at different times, even in parallel by multiple users. AS 102 may then receive one or more annotations made to the captured video frame by users of one or more client devices (step 312). The annotations may be received by AS 102 in different ways. For example, the annotations may be received in the form of strokes (connected sequences of line segments), text, an overlayed image comprising the captured video frame with overlayed annotations, and the like.

AS 102 may optionally store the received annotations (step 314). In one embodiment, the annotations information may also include metadata information such as timestamps (e.g., time of annotation), information identifying a client device or a user making the annotations, etc. This metadata information may be used when displaying the annotations. For example, an icon indicative of a user may be displayed next to the annotations made by the user. In one embodiment, the annotations may be stored separately from the captured image. In other embodiments, the annotations and the captured image may be stored together.

AS 102 is configured to send the set of annotations received in 312 to one or more client devices (step 316). In one embodiment, the set of annotations received in 312 may be sent to all the registered devices. In another embodiment, the set of annotations may be sent to a subset of the registered devices. For example, if the annotations are received in 312 from a first client device, the annotations may be sent in 316 to other client devices other than the first client device. However, the first client device may receive annotations made using other client devices. In this manner, annotations made using one client device are made available to and shared with the other registered client devices. A client device receiving the annotations may display the captured video frame with the annotations overlayed on the frame. In this manner, a client device is able to display the captured video frame along with all the annotations made to the captured video frame by one or more users.

In one embodiment, the set of annotations received by AS 102 may also optionally be sent to output device 106 (step 318). This enables the output device to display the captured video frame along with the annotations made by the various users. For example, if output device 106 is a projector, AS 102 may send the annotations received from one or more client devices to the projector so that the image displayed by the projector is that of the captured video frame along with the annotations overlayed on the captured video frame. In this manner, the annotations made by one or more users are displayed and shared with all the users.

There are different ways in which AS 102 may send the captured video frame and the associated annotations to the client devices or the output device 106. In one embodiment, AS 102 is configured to generate an overlayed video frame comprising the video frame captured in 304 overlayed with the annotations received in 312. The overlayed video frame thus generated is then communicated to the client devices and the output device. The communications from AS 102 to output device 106 or to the client devices 108 may be performed using wireless technologies, wired technologies, or combinations thereof The annotations received from the different client devices in 312 may be of different types, shapes, and forms. In one embodiment, when AS 102 sends the annotations to the client devices or to the output device, the type, shape, and form of the annotations are preserved. For example, if the annotations are received in different colors, then those colors are preserved when the annotations are communicated by AS 102 to the different client devices or to the output device. In this manner, annotations in multiple colors may be displayed by the output device or the client devices.

In one embodiment, AS 102 may be configured to automatically assign different colors to annotations received from different client devices. This makes it easy for the users of the client devices to distinguish annotations made by different users when displayed by the client devices or by the output device.

Steps 312, 314, 316, and 318 may be repeated as additional annotations are received from the client devices and are then distributed to the client devices and to the output device. In this manner, in the shared mode, AS 102 enables collaborative annotating of the captured video frames among users of the client devices. The shared mode may continue until a signal is received to exit the shared mode (step 320). The request or command to exit the shared mode may be received from one or more of the client devices. Upon receiving a signal to exit the shared mode, AS 102 is configured to exit the shared mode and unfreeze the output of output device 106 (step 322). AS 102 may unfreeze the output device by resuming sending the output device video information received by AS 102 from video source device 104. In this manner, communication of information received by AS 102 from video source device 104 to output device 106 is resumed for output by output device 106.

Figure 4:
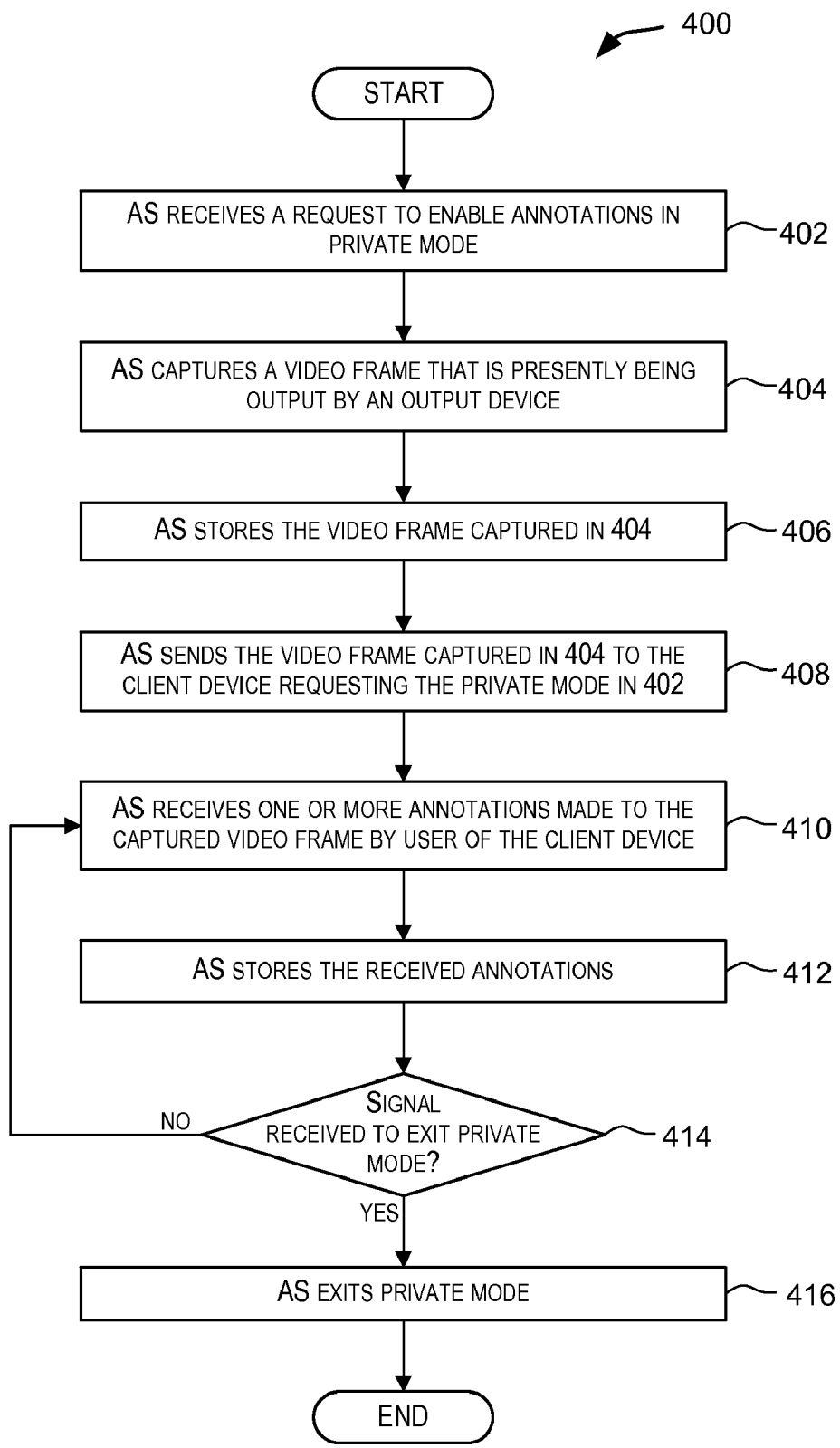
FIG. 4 is a simplified flowchart depicting a method of enabling and processing annotations in private mode according to an embodiment of the present invention.

FIG. 4 is a simplified flowchart 400 depicting a method of enabling and processing annotations in private mode according to an embodiment of the present invention. The method depicted in FIG. 4 may be implemented in software (e.g., program, code, instructions executed by a processor of AS 102), or hardware of AS 102, or combinations thereof. The software may be stored on a computer-readable storage medium. The method may be performed in a system such as system 100 depicted in FIG. 1.

As depicted in FIG. 4, the method is initiated when AS 102 receives a request from a client device to enable annotations to be performed in private mode (step 402). In response to the request, AS 102 is configured to capture a video frame that is presently being output by an output device (step 404). AS 102 may store the captured image (step 406). As part of 406, AS 102 may also store metadata information related to the captured video frame such as the date and time of the capture, information identifying the client device that triggered the capture, and the like.

AS 102 may then send the video frame captured in 404 to the client device requesting the private mode in 402 (step 408). The client device receiving the captured video frame may then display the captured video frame on the client device's display to enable the user of the client device to annotate the displayed captured video frame. It should be noted that in the private mode, the captured video frame is only sent to the client device requesting the private mode and not to other client devices as in the shared mode. Further, in private mode, the output of the output device is not frozen to display the captured video frame. AS 102 continues to pipe video information received from video source device 104 to output device 106 for display by the output device.

The user of the client device receiving the captured video frame in 408 may then make one or more annotations to the captured video frame. AS 102 may receive the one or more annotations made to the captured video from the client device (step 410). The annotations may be received by AS 102 in different ways such as in the form of strokes (connected sequences of line segments), text, an overlayed image comprising the captured video frame with overlayed annotations, and the like. AS 102 may store the received annotations (step 412). Steps 410 and 412 may be repeated as additional annotations are received from the client device.

The private mode may continue until a signal is received from the client device to exit the private mode (step 414). The private mode may then be exited (step 416). AS 102 is capable of supporting multiple private mode sessions with different client devices in parallel.

In one embodiment, a user may also be able to switch from one annotation mode to another. For example, a user can switch from private mode to shared mode. The user may send such a request to AS 102 using the user's client device. When such a request is received, AS 102 may resume operations according to the shared mode depicted in FIG. 3 and described above. For example, AS 102 may communicate the video frame captured in the private mode to the other client devices and cause the output of the output device to display the captured video frame. AS 102 may also communicate the annotations made by the user in private mode to the other client devices. AS 102 may then receive annotations from one or more of the client devices. The annotations may then be distributed to all the client devices, not just to the client device initially requesting the private mode. The annotations may also be sent to the output device for display by the output device.

AS 102 may also be configured to perform various other operations in response to requests received from one or more client devices 108. In one embodiment, AS 102 may be configured to compile an electronic document using video frames captured from the stream of video information received by AS 102 from video source device 104 during a presentation. AS 102 may compile such a document in response to a request received from a client device. For example, AS 102 may aggregate one or more video frames captured by AS 102 into an electronic document. Any annotations associated with the video frames included in the electronic document may also be included in the electronic document and overlayed on the corresponding frames. The electronic document may be generated for a session (e.g., a presentation) and may comprise video frames captured for the session and any associated annotations. The resultant electronic document comprises the captured video frames with overlayed annotations. In this manner, a record is preserved of the annotation activity during a session. Further, the ability of AS 102 to store electronic documents of video frames rather than just video information allows AS 102 to be used for document review and markup sessions of the electronic documents. The electronic documents may also be printed by sending a request to AS 102 to generate a physical paper representation of the document.

There are different ways in which video frames may be captured by AS 102. According to one way, as described above, video frames are captured upon receiving annotation requests. According to another way, in addition to video frames captured as a result of annotation requests, AS 102 may be configured to, during a presentation, capture video frames from the video information received from video source device 104 at regular intervals and store ones that are sufficiently different from the previously captured and stored video frame. In such an embodiment, AS 102 may be configured to generate an electronic document of the captured video frames along with annotations, if any, made to any of the captured video frames. For video frames that have been annotated, the generated electronic document comprises an overlayed image of the captured video frame and its annotations. AS 102 may compile such a document in response to a request received from a client device. The electronic document generated by AS 102 represents a summary of the presentation along with any annotations made by users during the presentation.

AS 102 may also enable operations to be performed on the electronic documents generated by AS 102. For example, services may be provided for loading previously stored electronic documents, browsing or navigating through the electronic documents, communicating (e.g., email, fax, etc.) the electronic documents, etc.

Figure 5:
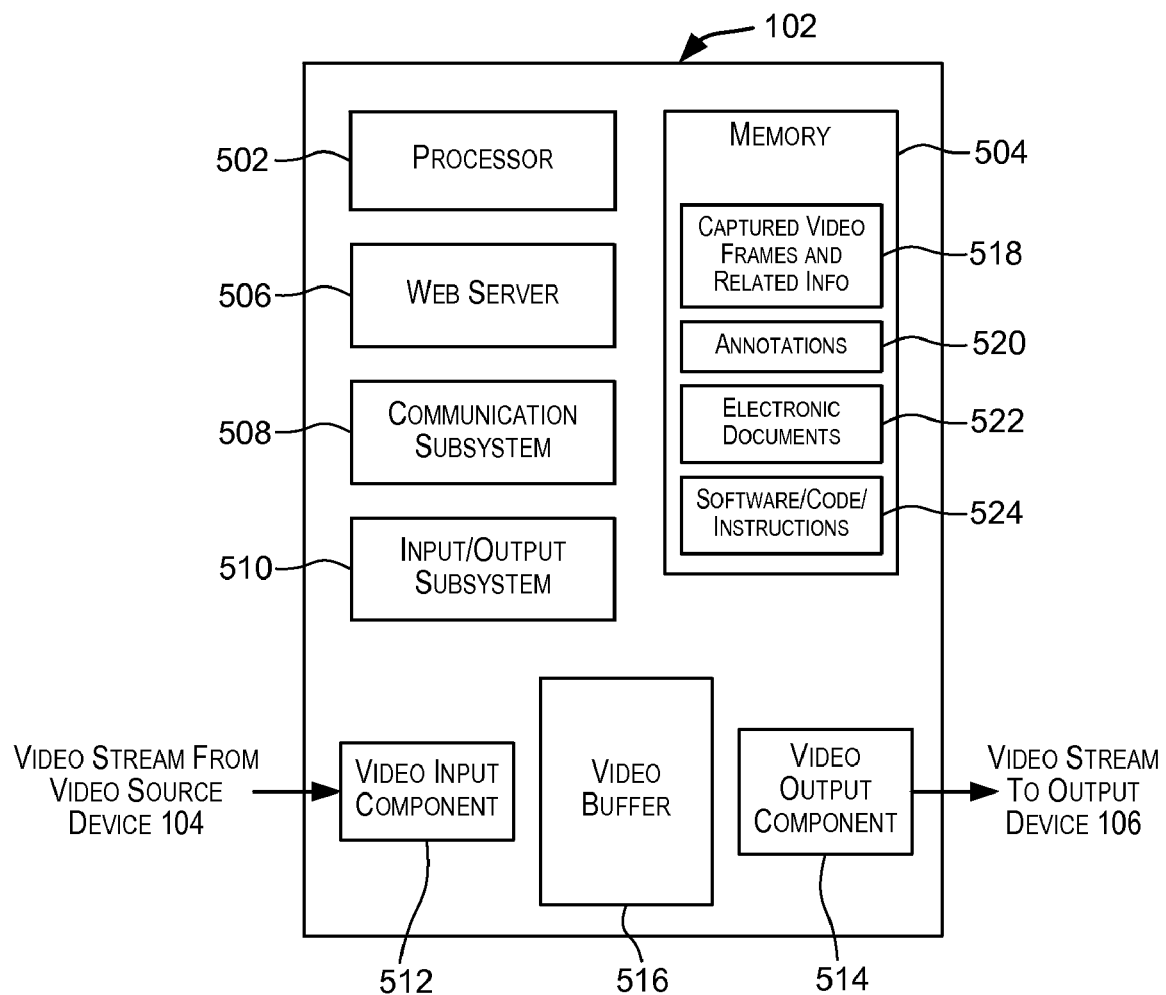
FIG. 5 depicts a simplified block diagram of an annotations system according to an embodiment of the present invention.

FIG. 5 depicts a simplified block diagram of an AS 102 according to an embodiment of the present invention. The embodiment depicted in FIG. 5 is merely illustrative and is not intended to limit the scope of the present invention. Various changes and modifications to what is displayed in FIG. 5 are possible. As depicted in FIG. 5, AS 102 comprises several subsystems and components including a processor 502, a memory 504, a web server 506, a communication subsystem 508, an input/output subsystem 510, a video input component 512, video output component 514, and a video buffer 516. AS 102 may work on different operating systems including Linux, Windows and its variants, and the like. In one embodiment, AS 102 is a Linux-based computer running the X-windows system.

Processor 502 is configured to perform a majority of the processing performed by AS 102. For example, processor 502 may be configured to perform the operations depicted in flowcharts in FIGS. 2, 3, and 4 and described above. In one embodiment, processor 502 may be configured to perform the operations by executing one or more code modules or software instructions, which may be stored on a computer-readable storage medium such as memory 504.

Memory 504 stores the basic programming and data constructs that provide the functionality of the present invention. Memory subsystem 504 may include a number of memories including a main random access memory (RAM) for storage of instructions and data during program execution and a read only memory (ROM) in which fixed instructions may be stored. Memory subsystem 504 may also comprise persistent (non-volatile) storage for program and data files, and may include a hard disk drive, a floppy disk drive along with associated removable media, a CD or DVD drive, an optical drive, removable media cartridges, and the like.

As indicated above, memory 504 may store the programming and data constructs used for providing the functionality of the present invention. As depicted in FIG. 5, memory 504 may store video frames 518 captured by AS 102 along with information related to the captured video frames, annotations 520 received from one or more client devices, electronic documents 522 created by AS 102 comprising one or more of the captured video frames and the annotations, and software or code instructions or modules 524 that when executed by processor 502 provide the functionality of the present invention. For an electronic document, information 522 may include metadata information identifying when the electronic document was created, who had requested creation of the electronic document, the presentation to which the electronic document corresponds, and other information. Annotations 520 may include metadata information associated with the annotations such as timestamp information on when the annotations were made, information identifying a user who made the annotations, information identifying the client device used to make the annotations, and other information related to the annotations.

As indicated in FIG. 5, the annotations 520 may be archived separately from the captured video frames 518. This enables AS 102 to easily create electronic documents comprising captured video frames with or without annotations. Annotations may also be stored on a per client device basis such that AS 102 can easily determine annotations received from a particular client device. In one embodiment, AS 102 may store a hash-chained log of captured video frames and annotations. Such a log allows strong assertions to be made about the sequence and timing of frames and assertions (see Bruce Schneier, John Kelsey, "Cryptographic Support For Secure Logs On Untrusted Machines," Proceedings of 7th USENIX Security Symposium, San Antonio, Tex., Jan. 26-29, 1998, p. 4-4, the entire contents of which are incorporated herein by reference for all purposes). Memory 504 represents a computer-readable storage medium for storing the software/code instructions. Other information may also be stored in memory 504.

Communication subsystem 508 is configured to facilitate communication of data to and from AS 102. For example, communication subsystem 508 facilitates communications between AS 102 and client devices 108. Client devices may send requests/commands, annotations, and other information to AS 102. AS 102 may communicate captured video frames, annotations, overlayed images, electronic documents, and other information to the client devices. Different communication protocols may be used to facilitate the communications including wired and wireless protocols. In one embodiment, between a client device and AS 102, the same protocol may be used for the communications. In alternative embodiments, different protocols may be used.

Input/Output devices allow a user to interact with AS 102. Input devices may include a stylus, a digital pen, a mouse, a keyboard, voice activated input, and the like. Output devices may include devices that enable information to be output from AS 102 such as a display or monitor.

As described above, AS 102 receives a video stream from video source device 104 and communicates a video stream to output device 106. Video input component 512 enables receipt of video information from multiple sources including from video source device 104. In one embodiment video input component 512 is a video capture card. The video capture card may be connected to the video output (e.g., VGA port, DVI port, HDMI port, etc.) of a video source device executing a presentation such as a PowerPoint presentation. Video input component 512 may be capable of receiving the information via a wire or wirelessly.

The video information received via video input component 512 may be buffered in video buffer 516 prior to the video information being communicated to video output component 514. Video output component 514 enables video information from video buffer 516 (and which may represent information received from video source device 104) to be communicated from AS 102 to an external device such as to output device 106. In one embodiment video output component 514 is a display controller card. The display controller card may be connected to the video input (e.g., VGA port, DVI port, HDMI port, etc.) of output device 106. Video output component 512 is capable of transmitting the information via a wire or wirelessly.

In one embodiment, AS 102 may provide an interface than may be utilized by clients to enable annotations. For example, AS 102 may comprise a web server 506 that provides a web interface that client devices may use to perform annotations. In one embodiment, web server 506 may host a page that is accessible via a URL. A client device may then connect to the host page using the URL. For example, if the client device is a tablet or a laptop computer, a user of the laptop by providing the URL for the hosted page to a browser on the client device enables the client device to connect to the hosted page. The hosted page may provide the client device an interface for annotating the video frames. For example, the hosted page may provide a simple web form to add text annotations. In another embodiment, the hosted page may be a full Flash, JavaScript or JavaApplet based interface that updates the annotations on the display in real-time and offers a rich annotation-authoring environment. For example, upon connecting to the hosted page, the Flash, Javascript, or JavaApplet application may be downloaded to the client device connected to the hosted page. The downloaded application may then be executed on the client device thereby enabling the client device to perform annotations. Web server 506 may provide various applications that facilitate annotations. In this manner, a client device does not need to have preconfigured annotation capabilities—AS 102 enables a client device to perform annotations through the use of web server 506. Web server 506 may also enable a user of a client device to connect to the Internet using AS 102.

AS 102 can be of various types. Due to the ever changing nature of computers, the description of AS 102 depicted in FIG. 5 is intended only as a specific example for purposes of illustrating an embodiment of the present invention. It should be apparent that various other configurations of AS 102 are possible having more or fewer subsystems or components than the system depicted in FIG. 5.

While embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method of facilitating annotations, the method comprising:
   receiving, by a first device, a video stream comprising a plurality of video frames;
   displaying, by the first device, the video stream via an output device;
   receiving, by the first device from a client device, a request for annotating the video stream;
   in response to receiving the request, freezing, by the first device, display of the video stream;
   capturing, at the first device, a video frame from the video stream, the captured video frame corresponding to a video frame being displayed by an output device at the time of the freezing;
   receiving, by the first device from the client device, annotation information for the captured video frame;
   generating, by the first device, a document, the document comprising the captured video frame with the annotation information overlaid on the captured video frame; and
   communicating, by the first device, the document to the client device.

2. The method of claim 1 further comprising:
   receiving, at the first device, a set of one or more annotations from one or more client devices in a set of client devices, the set of one or more annotations comprising annotations for the captured video frame made using one or more client devices from the set of client devices.

3. The method of claim 2 further comprising:
   communicating the set of annotations from the first device to the output device thereby causing the output device to display the captured video frame with the set of annotations overlayed on the captured video frame.

4. The method of claim 2 further comprising:
   capturing, at the first device, one or more video frames from the video stream received by the first device, the one or more video frames including the video frame captured by the first device in response to the request received from the client device; and
   generating a document at the first device comprising the one or more video frames and the first set of annotations.

5. The method of claim 2 wherein the set of annotations comprises annotations received from multiple client devices from the set of client devices, the method further comprising communicating the set of annotations from the first device to the output device thereby causing the output device to display the captured video frame with the set of annotations overlayed on the captured video frame.

6. The method of claim 1 wherein the client device is one of a set of client devices and wherein the request is received from a first client device from the set of client devices, the method further comprising:
   communicating the captured video frame to only the first client device.

7. The method of claim 6 further comprising:
   receiving, at the first device, a set of one or more annotations from the first client device, the set of annotations representing annotations made to the captured video frame using the first client device; and
   storing the set of one or more annotations at the first device.

8. The method of claim 1 further comprising:
provide a server at the first device, the server providing an interface that enables the captured video frame to be annotated by a client device from the set of client devices.

9. The method of claim 8 further comprising downloading an application from the first device to a client device from the set of client devices, wherein the application enables the client device receiving the application to annotate the captured video frame.

10. A system for facilitating annotations, the system comprising:
a memory; and
a processor, wherein the processor is configured to:
capture and freeze a video frame from a video stream in response to a request received from a client device in a set of one or more client devices, the captured video frame corresponding to a video frame being displayed by an output device;
enable the captured video frame to be annotated using a client device from the set of client devices;
receive a set of one or more annotations from one or more client devices in the set of client devices, the set of one or more annotations comprising annotations for the captured video frame made using one or more client devices from the set of client devices;
generate a document comprising the set of one or more annotations and the captured video frame; and
communicate the document to multiple client devices in the set of client devices thereby enabling the multiple client devices receiving the document to display the captured video frame with the set of one or more annotations overlayed on the captured video frame.

11. The system of claim 10 wherein the processor is configured to:
communicate the set of annotations to the output device thereby causing the output device to display the captured video frame with the set of annotations overlayed on the captured video frame.

12. The system of claim 10 wherein the processor is configured to:
capture one or more video frames from the video stream, the one or more video frames including the video frame captured in response to the request received from the client device; and
generate a document comprising the one or more video frames and the first set of annotations.

13. The system of claim 10 wherein:
the request is received from a first client device from the set of client devices; and
the processor is configured to communicate the captured video frame to only the first client device.

14. The system of claim 13 wherein the processor is configured to:
receive a set of one or more annotations from the first client device, the set of annotations representing annotations made to the captured video frame using the first client device; and
store the set of one or more annotations in the memory.

15. The system of claim 10 wherein the processor is configured to:
provide a server that provides an interface that enables the captured video frame to be annotated by a client device from the set of client devices.

16. A non-transitory computer-readable storage medium storing a plurality of instructions for controlling a processor to facilitate annotations, the plurality of instructions comprising:
instructions that cause the processor to capture and freeze display of a video frame from a video stream, the capturing performed in response to a request received from a client device in a set of one or more client devices, the captured video frame corresponding to a video frame being displayed by an output device;
instructions that cause the processor to enable the captured video frame to be annotated using a client device from the set of client devices;
instructions that cause the processor to receive a set of one or more annotations from one or more client devices in the set of client devices, the set of one or more annotations comprising annotations for the captured video frame made using one or more client devices from the set of client devices;
instructions that cause the processor to generate a document comprising the annotations for the captured video frame and the captured video frame;
instructions that cause the processor to communicate the document to the output device thereby causing the output device to display the captured video frame with the set of annotations for the captured video frame overlayed on the captured video frame; and
instructions that cause the processor to communicate the document to multiple client devices in the set of client devices thereby enabling the multiple client devices receiving the document to display the captured video frame with the set of annotations for the captured video frame overlayed on the captured video frame.

17. The computer-readable storage medium of claim 16 wherein the plurality of instructions comprise:
instructions that cause the processor to capture one or more video frames from the video stream, the one or more video frames including the video frame captured in response to the request received from the client device; and
instructions that cause the processor to generate a document comprising the one or more video frames and the first set of annotations.

18. The computer-readable storage medium of claim 16 wherein:
the set of annotations comprises annotations received from multiple client devices from the set of client devices; and
the plurality of instructions comprises instructions that cause the processor to communicate the set of annotations to the output device thereby causing the output device to display the captured video frame with the set of annotations overlayed on the captured video frame.

19. The computer-readable storage medium of claim 16 wherein:
the request is received from a first client device from the set of client devices; and
the plurality of instructions further comprises:
instructions that cause the processor to communicate the captured video frame to only the first client device; and
receive a set of one or more annotations from the first client device, the set of annotations representing annotations made to the captured video frame using the first client device.

20. A method comprising:
receiving, by a first device, a first request from a first client device, the first request requesting the first device to enable a first annotation mode, wherein the first device is operable in a plurality of annotation modes;

enabling, by the first device, the first annotation mode, based on the request;

displaying, by the first device, a video stream on an output device;

receiving, by the first device, a first signal from the first client device for annotating the video stream;

in response to the first signal, capturing and freezing, by the first device, a first video frame being currently displayed by the output device;

receiving, by the first device from the first client device, a first set of annotations for the captured first video frame;

generating, by the first device, a first document; wherein the first document comprises the first set of annotations overlayed on the captured first video frame; and sending, by the first device, the first document only to the first client device.

21. The method of claim 20 further comprising:

receiving, by the first device from a second client device, a second signal for annotating the video stream;

in response to the second signal, capturing, by the first device, a second video frame being displayed by the output device;

receiving, by the first device, a second set of annotations for the second video frame;

generating, by the first device, a second document comprising the second set of annotations overlayed on the second video frame; and communicating, by the first device, the second document only to the second client device.

22. The method of claim 21 wherein the first video frame is same as the second video frame.

23. The method of claim 20 further comprising:

receiving, by the first device, a second request from the first client device to enable a second annotation mode;

in response to the second request, sending, by the first device to the output device, the first document; and enabling, by the first client device, a second client device to annotate the first document.

24. The method of claim 23 further comprising sending, by the first device, the first image to the second client device.

* * * * *